United States Patent Office 3,843,489
Patented Oct. 22, 1974

3,843,489
METHOD OF DETERMINING SURFACE AREA AND METER THEREFOR
Yehuda L. Sandler, Pittsburgh, Pa., assignor to Westinghouse Electric Corporation, Pittsburgh, Pa.
Filed May 1, 1973, Ser. No. 356,267
Int. Cl. G01n 27/46
U.S. Cl. 204—1 T     13 Claims

ABSTRACT OF THE DISCLOSURE

An electrical method for determining the surface area of particles is disclosed. A solid electrolyte galvanic cell is used to measure the oxygen that is lost from an oxygen-inert gas mixture by physical adsorption on the sample at a low temperature. A direct readout in terms of surface area is obtained. The method is fast, reliable, requires no calibration and is easily automated.

BACKGROUND OF THE INVENTION

Field of the Invention

This invention relates to surface area measurements and particularly to methods and apparatus for utilizing electrochemical cells to determine the surface area of a sample by measuring the quantity of a gas which is adsorbed on the surface of the sample as the sample is cooled to a low temperature.

Description of the Prior Art

Knowledge of the surface area of particles is of major importance in many industrial products like catalysts, pigments for paints, phosphors for the electrical industry, ceramic powders, carbon blacks and battery electrodes. The surface area is usually determined by adsorbing an inert gas, like nitrogen or krypton on a specimen of the material which has been cooled to the temperature of liquid nitrogen. By volumetric measurements giving the amount of gas physically adsorbed as a function of gas pressure, the quantity of gas required to produce a surface coverage of one monolayer and hence the surface area itself can be calculated. The theory made use of is the BET theory named after Brunauer, Emmett and Teller. The method is accurate but is very time consuming even when a computer is available to handle the data.

In most adsorption measurements the quantities determined are gas pressure and volume (an amount of gas) at a known temperature. One or both of these quantities may be determined by means of one or more electrochemical cells. The gases which a particular cell will respond to depends on the construction of the cell.

The voltage across the cell is generally related to the gas pressure at the electrodes of the cell. Specifically, when a reversible gas concentration cell is used the relationship between pressure of the selected gas at the electrodes and open-circuit voltage $E$ is $$E = 2.30 \, (RT/nF) \, \log P_1/P_2,$$

when $P_2$ is the reference pressure at one electrode of the cell and $P_1$ is the unknown pressure. R is the gas constant, T the absolute temperature, $n$ is the number of electric charges transferred per gas molecule and F is the Faraday Constant=96,500 Coulombs. A specific example of this kind of cell is the oxygen gauge, as described in the patent of Ruka and Weissbart (3,400,054).

The current through a cell, on the other hand, can be used to determine gas amounts. The gas can either be added to the adsorption system by means of the cell, or the gas present can be totally removed by the cell and be measured by reading the cell current, as done in the disclosed embodiment of the invention. If the transport number for the ions of the electrolyte is equal to 1, the electric charge $q$ in Coulombs (or Ampere seconds) is strictly related to the number of moles of gas "$m$" transferred from one electrode to the other: $q=mnF$.

$q$ is determined by integrating the current $i$ (Ampere) with respect to time $t$ (seconds):

$$q = \int_0^t i \, dt.$$

SUMMARY OF THE INVENTION

In the disclosed preferred embodiment of this invention an oxygen-inert gas mixture is passed, at a known rate, over a sample of the material whose surface area is to be determined, the sample is cooled to a low temperature, preferably the temperature of liquid nitrogen and an electrochemical cell is used to measure the change in the oxygen concentration caused by adsorption of the oxygen on the surface of the sample. The galvanic cell utilizes an oxygen ion conducting electrolyte at high temperatures. This cell is particularly suited to the application because of its fast and accurate response. In the disclosed embodiment, the galvanic cell consists of a calcia-doped zirconia tube with platinum or silver electrodes applied to the outside and inside. Other galvanic cells and gas mixtures may be used.

In principle, a galvanic cell can be used in a variety of ways to obtain the necessary pressure and/or volume data for adsorption measurements. As previously explained, the current through an electrochemical cell is generally related to the amount of gas transmitted through the electrolyte in the form of ions, while the open circuit voltage is related to the gas pressure.

In the preferred embodiment described in this application, the galvanic cell is positioned downstream from the sample and used to sense the oxygen present in the gas stream by electrochemically pumping all of the oxygen out of the gas stream. The pumping current required to remove all of the oxygen has a known relationship to the amount of oxygen removed. The change in the current with respect to time as the sample is cooled to the temperature of liquid nitrogen is integrated to determine the amount of oxygen adsorbed on the surface of the sample. A high enough enough voltage is applied to the cell so as to obtain the limiting current corresponding to total removal of the oxygen from the gas stream.

Electrochemical cells may also be used to add a known amount of oxygen to a closed system containing the sample and to determine the resulting pressure. From these parameters the quantity of gas adsorbed by the sample can be determined.

DETAILED DESCRIPTION OF THE PREFERRED EMBODIMENT

The disclosed invention is based on the BET method of determining surface area. The original form of the BET equation is shown below.

$$\frac{x}{V(1-x)} = \frac{1}{V_m c} + \frac{(c-1)}{V_m c} x, \qquad (1)$$

In the above equation, $x=p/p°$ is the relative pressure of the gas when $p$ is the partial pressure of the absorbed gas and $p°$ is the equilibrium vapor pressure of the condensed gas at the temperature of adsorption, and $c$ is a constant. In a "BET plot" the function $x/V(1-x)$ is plotted versus $x$, usually giving a straight line for the range 0.05 to 0.35. According to equation (1), the slope of the line is $(c-1)/V_m c$, the intercept with the ordinate is $1/V_m c$. The sum of the two then is $1/V_m$.

Thus, $V_m$, the gas volume is cc. (STP) required to cover the surface with one monolayer, is obtained.

The disclosed apparatus illustrating the preferred embodiment of the invention utilizes the BET method and so-called one point approximation to measure the surface area of a sample.

The value of the constant $c$ (from the original BET derivations) usually is of the order of $10^2$. Thus in equation 1), $1/V_m c \approx 0$. This is the equivalent of drawing a straight line from one measured point in the BET diagram through the origin. The larger the value of $x$ chosen within the range of validity of the BET equation, the smaller the error in the slope will be. The range of validity usually is from $x=0.05$ to about 0.35. With $(c-1)/c=1$ and $$\frac{1}{V_m c} = 0,$$

equation (1), assumes the simple form $$V_m = V(1-x). \tag{2}$$

In terms of the surface area S, equation (2) may be written as:

$$S = NA(1-x) \tag{3}$$

where $N$ is the number of adsorbed molecules and $A$ is the cross-sectional area of the adsorbed molecule.

In the disclosed method N is substituted by a measured amount of electric charge $q$ which is found by integration of the change in pumping current due to adsorption of oxygen on the sample when it is cooled to liquid nitrogen temperature. From Faraday's law and a value of A of $1.40 \times 10^{-15}$ cm.$^2$ for oxygen, a charge $q$ of 1 amp sec. corresponds to a covered area [NA in equation (3)], of 0.218 square meters. Equation (3) then becomes $$S = 0.218(1-x)q$$

For example, at an average atmospheric pressure of 730 torr (in Pittsburgh), $p°$ for oxygen at the temperature of the liquid nitrogen bath boiling at atmospheric pressure is 160 torr. For a gas mixture consisting of 6.7% oxygen in helium, the term $(1-x)=0.67$. This reduces equation (4) to the following equation.

$$S = 0.146q.$$

In the above equations:

S is in units of meter$^2$.
$q$ is in amp seconds or coulombs.

Figure 1:
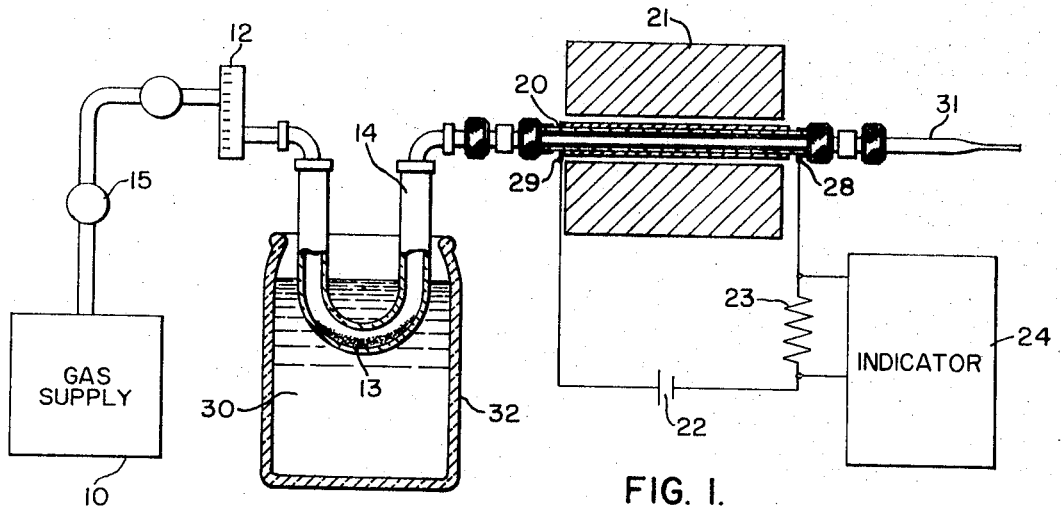
FIG. 1 is a functional block diagram illustrating the surface area meter.

FIG. 1 illustrates the apparatus comprising the disclosed invention. A gas supply system 10 provides the gas mixture utilized in making the measurements. The gas supply system 10 may be a conventional gas bottle containing the proper mixture of gases or it may include apparatus for forming the required mixture. The gas mixture passes through a regulator 15, a flowmeter 12 (not essential for the measurement) and over the sample 13, which is contained in a sample holder 14, and passes through the electrochemical cell 20. Generally, it is advantageous to design the sample holder such that the cooled gas volume is as small as possible. The electrochemical cell 20 is maintained at the proper operating temperature by a heating device preferably containing a temperature controlling device. The heating element 21 may be a conventional resistance type electric heater. Other types of heaters could also be used.

The system also includes a DC voltage source 22 for supplying the voltage and currents necessary for operating the cell 20. The voltage source 22 is series coupled to the electrochemical cell 20 by a resistor 23. The indicator 24 utilizes the voltage drop across resistor 23 to produce an indication of the current and thus surface area of the sample 13 which is positioned in the U-shaped holder 14.

The end of the electrochemical cell 20 is coupled to a discharge tube 31. It provides sufficient volume to prevent air from being drawn into the electrochemical cell 20 when the sample 13 is being cooled. The diameter of the output end of the discharge tube is reduced to form a capillary.

Figure 2:
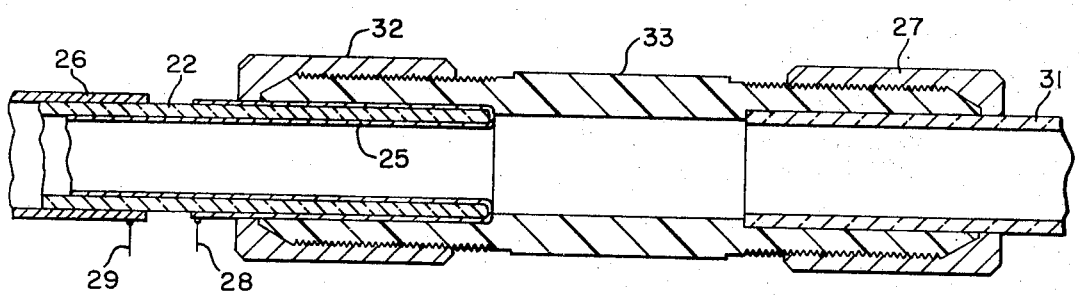
FIG. 2 is a partial cross section of the electrochemical cell.

The electrochemical cell 20, the discharge tube 31 and a coupling joining these two elements are illustrated in cross-section in FIG. 2. The electrochemical cell 20 includes a tubular solid electrolyte 22 made of calcia-doped zirconia. The inner and outer surfaces of the electrolyte 22 are covered with electrically conductive, oxygen pervious layers 25 and 26 as electrodes. Fired on silver or platinum paste is usually employed to form the electrodes. Electrical connections to these two layers can be made by any convenient means which permits the cell to be connected as illustrated in FIG. 1 and previously discussed.

The coupling includes a body portion 33 with pressure fittings at each end. The electrochemical cell 20 and the discharge tube 31 are positioned in the pressure fittings and secured in place by tightening coupling nuts 27 and 32. As explained above, the operation of the system is based upon measuring the amount of oxygen adsorbed as the sample 13 is cooled to a very low temperature, generally in the range of the temperature of liquid nitrogen. To cool the sample 13 to the proper temperature, the U-shaped sample holder 14 is immersed in a pool of liquid nitrogen 30. The liquid nitrogen is contained in a Dewar Flask 32. The sample holder 14 may be positioned in the liquid nitrogen #30 using any convenient means. The speed of operation of the system is such that this operation may be performed manually.

The electrochemical cell 20 consists of a tubular solid electrolyte member 22 made of calcia-doped zirconia. The temperature of the electrochemical cell 20 is chosen high enough so that the current through the electrolyte 22 is not limited by the resistance of the electrolyte, but by the amount of oxygen in the gas mixture passing through the cell 20. A constant voltage in the order of 0.2–1.2 volt, preferably about 0.7 volt, is applied between the electrodes 25 and 26 of the electrochemical cell 20. The exact voltage can vary depending on the design parameters of the cell. The positive terminal of the voltage source 22 is connected to the outside terminal which is exposed to air.

Figure 3:
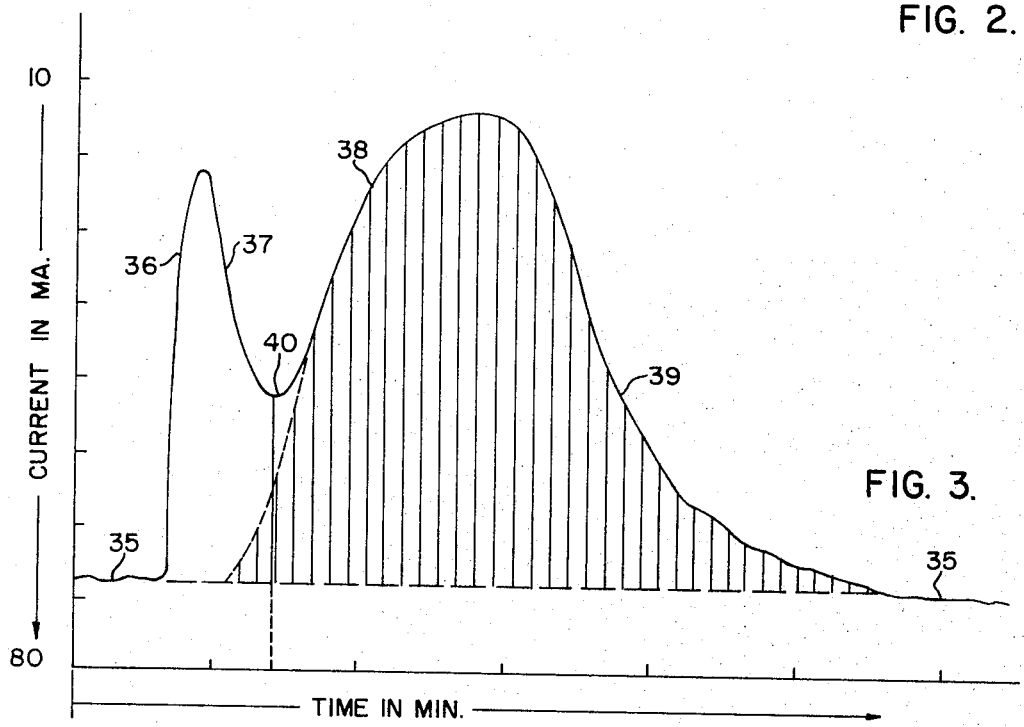
FIG. 3 is a curve illustrating the current through the electrochemical cell as the oxygen is adsorbed on the sample whose surface area is to be measured.

FIG. 3 is a diagram illustrating the current flowing through a resistor 23 and the electrochemical cell 20 as the U-shaped sample holder 14 and the sample 13 is cooled by positioning the U-shaped sample holder 14 in the liquid nitrogen pool 30. The first flat portion of the curve illustrated at reference numeral 35 is the current through the electrochemical cell 20 when the sample 13 is at room temperature. This is the current produced by the electrochemical cell 20 as all the oxygen in the helium-oxygen mixture from the gas supply 10 is removed from the system through the electrolyte of the electrochemical cell 20. When the sample holder 14 is positioned in the nitrogen pool 30 the volume of gas contained in the sample holder begins to contract and causes some of the gas which is in the volume chamber 31 to be drawn back inside the electrochemical cell 20. Since the gas in the expansion chamber 31 is essentially pure helium, because all of the oxygen has been previously removed by the electrochemical cell, the current in the electrochemical cell will drop as this gas is drawn back inside the cell. This drop in current is illustrated at reference numeral 36 of FIG. 3.

After a brief period of time, this backward flow of gas will cease and the normal flow of gas will be reestablished. As this happens, the oxygen content of the gas inside the electrochemical cell 20 will increase and the current through the electrochemical cell 20 will again begin to increase. This increase in current is illustrated at reference numeral 37 of FIG. 3. The current through the electrochemical cell 20 will continue to increase until the oxygen content of the gas flowing through the cell begins to decrease due to adsorption of oxygen on the surface of the sample 13. This portion of the curve is illustrated at reference numeral 38 of FIG. 3.

When the oxygen adsorption nears completion, the current begins to rise due to an increase in oxygen concentration of the gas flowing through the electrochemical cell 20. This increase in the current through the electrochemical cell 20 is illustrated at reference numeral 39 of FIG. 3. This current will continue to increase until it reaches a value substantially equal to its original value. The area indicated in FIG. 3 by cross-hatching is proportional to the total amount of oxygen adsorbed on the surface of the sample 13. In general, this area can be thought of as the difference between two quantities. The first would represent the current necessary to remove all of the oxygen from the gas flowing through the system prior to cooling of the sample. The second quantity is a function of time and is represented by a curve that describes the decrease in current through the electrochemical cell as the sample is cooled by immersing the U-shaped holder 14 in the nitrogen bath 30.

A convenient method of determining the cross-hatch area of FIG. 3 is to observe the current through the electrochemical cell as the sample holder is immersed in the liquid nitrogen and starting an integrator at point 40 of FIG. 3 when the current goes through a maximum. The integration is continued until the current through the electrochemical cell returns to its base value indicated at reference numeral 35 in FIG. 2. Utilizing this method of integration, the system indicated in FIG. 2 has been found to yield results closely corresponding to those obtained by using conventional BET methods. The operation of the disclosed surface area meter was verified by the following experiment. A sample consisting of 174 Milligrams of a cobalt oxide ($Co_3O_4$) powder was placed at the bottom of the U-shaped sample holder 14. A mixture of 6.7% oxygen in helium was passed over the sample, and the latter was heated to 150° C. by a resistance heating element to drive off adsorbed gases. The heater was removed and the flow of the oxygen-helium mixture was adjusted to give a constant current of 78 ma., through the electrochemical cell 20. This current is represented by the flat initial portion 35 in FIG. 3 which is an actual current recording obtained for the described case. The initial current 35 corresponds to a flow rate of the mixture of 4.4 cc. (STP)/minute as can be calculated from Faraday's law. When the sample holder was dipped in a liquid nitrogen bath, the curve shown in FIG. 3 was traced on the current recorder 24 (FIG. 1). In the illustrated example, the shaded area under the curve corresponds to an electric charge $q$—10.6 amp sec. With the 6.7% $O_2$ used in this experiment, according to Eq. (6b), surface area $S$—0.146$q$—1.55 m.$^2$ for the 174 mg. used, or 8.9 m.$^2$/g.

The shaded area under the curve may be determined manually by well known means, for example, by using a planimeter, or weighing of a cellophane replica of the shaded area under the curve. An electronic integrating device zeroed with respect to the base current was also used. It was started at the current maximum, point 40 in FIG. 3.

The measured surface area is about the same as obtained by the conventional complete BET method which gave a value of 9.0 m.$^2$/g. for the material after having been pretreated by 15 minutes degassing in vacuo at room temperature. The method of pretreatment and the gas mixture can be changed. For the sake of convenience the same oxygen-helium mixture was used for the pretreatment as used in the adsorption run. The pretreatment may also be conducted in a pure helium or in a vacuum at an elevated temperature.

The integration discussed above may be performed by a simple manually controlled analog integrator. The response of the apparatus is sufficiently slow to permit the integration cycle to be started and stopped manually based on visual observations of the current through the electrochemical cell 20. Automated means, such as a digital computer could also be used to control the process. Many other modifications could also be made to adapt the apparatus to solve specific problems.

I claim:

1. A method for determining the surface area of a sample, comprising in combination:
    (a) exposing said sample to a selected gas;
    (b) cooling said sample to cause said gas to be adsorbed by said sample;
    (c) utilizing at least one electrochemical cell to generate at least one signal having a predetermined relationship to the amount of said gas adsorbed by said sample; and
    (d) processing said signal to determine the surface area of said sample.

2. The method of determining the surface area of a sample in accordance with claim 1 wherein said selected gas is oxygen mixed with an inert gas which is not adsorbed.

3. The method of determining the surface area of a sample in accordance with claim 2 wherein the mixture of oxygen and an inert gas flows over said sample at a predetermined rate and an electrochemical cell positioned downstream from said sample is utilized to remove substantially all of said oxygen from said mixture by electrochemical pumping thereby generating at least one signal from which the surface area of said sample can be determined.

4. The method of determining the surface area of a sample in accordance with claim 3 wherein the pumping current of said electrochemical cell and a one point adsorption method is utilized to determine the surface area of said sample.

5. Apparatus for determining the surface area of a sample, comprising in combination:
    (a) means for subjecting said sample to a selected gas;
    (b) means for cooling said sample to a selected temperature;
    (c) electrochemical cell means for generating at least one signal having a known relationship to the quantity of said gas adsorbed by said sample; and
    (d) processing means utilizing said signal to determine the surface area of said sample.

6. The apparatus defined by claim 5 wherein said electrochemical cell includes a solid tube member forming an electrolyte and first and second electrodes respectively disposed on the inner and outer surface of said solid electrolyte.

7. The apparatus defined by claim 6 further including means for applying a voltage between said first and second electrodes.

8. The apparatus defined by claim 7 further including means for determining the current through said electrochemical cell with respect to time.

9. The apparatus defined by claim 8 wherein the instantaneous value of said current represents substantially total removal of the oxygen from said mixture of gases, further including apparatus for determining the rate of adsorption based on the difference in said current before and during the measurement cycle.

10. The apparatus defined by claim 9 wherein the surface area is determined by the integral of said difference with respect to time.

11. The apparatus defined by claim 10 wherein the integral value of said current is scaled to read directly the area of said sample.

12. The apparatus defined by claim 5 wherein said selected gas is oxygen mixed with helium.

13. The apparatus defined by claim 5 wherein said means for subjecting said sample to a gas mixture comprises:
   (a) a gas supply means for supplying said selected gas;
   (b) a sample holder;
   (c) gas flow regulating means; and
   (d) coupling means for coupling said gas supply means to said regulation means and for coupling said regulation means to said sample holder such that said mixture of gases flows over said sample at a rate determined by said regulation means.

References Cited

UNITED STATES PATENTS 3,147,202  9/1964  Johnson et al. _____ 204—1 T

OTHER REFERENCES

J. F. Connolly et al., J. Electrochem. Soc., vol. 113, No. 6, pp. 577–580 (1966).

GERALD L. KAPLAN, Primary Examiner

U.S. Cl. X.R.

204—195 S, 274